US012344305B2

(12) United States Patent
Thompson et al.

(10) Patent No.: US 12,344,305 B2
(45) Date of Patent: Jul. 1, 2025

(54) DRIVE SYSTEM FOR A SKID STEERED VEHICLE

(71) Applicant: Renk America LLC, Muskegon, MI (US)

(72) Inventors: Robert William Thompson, Camberley (GB); Robert John Bonner Flaxman, Guildford (GB)

(73) Assignee: Renk America LLC, Muskegon, MI (US)

( * ) Notice: Subject to any disclaimer, the term of this patent is extended or adjusted under 35 U.S.C. 154(b) by 0 days.

(21) Appl. No.: 17/792,773

(22) PCT Filed: Jan. 11, 2021

(86) PCT No.: PCT/EP2021/050375
§ 371 (c)(1),
(2) Date: Jul. 14, 2022

(87) PCT Pub. No.: WO2021/144219
PCT Pub. Date: Jul. 22, 2021

(65) Prior Publication Data
US 2023/0042398 A1    Feb. 9, 2023

(30) Foreign Application Priority Data

Jan. 14, 2020 (GB) .................................. 2000519

(51) Int. Cl.
*B60K 17/12* (2006.01)
*B60K 17/04* (2006.01)
(Continued)

(52) U.S. Cl.
CPC ............. *B62D 11/16* (2013.01); *B60K 17/12* (2013.01); *B60K 17/16* (2013.01); *B62D 11/04* (2013.01);
(Continued)

(58) Field of Classification Search
CPC . B62D 11/16; B62D 11/04; B62D 5/00–5/32; B60K 17/12; B60K 17/16;
(Continued)

(56) References Cited

U.S. PATENT DOCUMENTS 2,730,182 A    1/1956   Sloane
6,953,408 B2   10/2005  Thompson
(Continued)

FOREIGN PATENT DOCUMENTS

CN    110836254 A      2/2020
DE    102005027117 A1  12/2006
(Continued)

OTHER PUBLICATIONS

International Search Report for PCT Patent App. No. PCT/EP2021/050375 (dated Jun. 9, 2021).
(Continued)

*Primary Examiner* — Tinh Dang
(74) *Attorney, Agent, or Firm* — Dorton & Willis, LLP

(57) ABSTRACT

A drive unit for a skid steered vehicle includes a controlled differential positioned between two shafts. The end of each shaft forms an output of the drive unit connected directly to the differential outputs via the shafts. A steer motor is in driveable communication with the differential, and an electric propulsion motor is in driveable communication with the shaft outputs. A gear reduction unit, and optional gear change unit, is positioned between the differential and the electric propulsion motor. The electric propulsion motor, the gear reduction unit and optional gear change unit are connected in a parallel connection with an output of the differential to the shaft outputs. The optional gear change unit includes an epicyclic gear reduction unit having an input and an output which provides drive input from the gear change unit to the shaft. A gear change set has a master gear that (Continued)

receives drive output from the electric propulsion motor, and slave gears which are driven by the master gear via one or more gear chains. A dog clutch slideably engages the input of the gear reduction unit and selectively engages with the master gear or slave gears so that the selected position of the dog clutch determines which gear is engaged.

16 Claims, 10 Drawing Sheets

(51) Int. Cl.
*B60K 17/16* (2006.01)
*B62D 11/04* (2006.01)
*B62D 11/16* (2006.01)
*F16H 48/05* (2012.01)
*F16H 48/10* (2012.01)
*F16H 57/023* (2012.01)

(52) U.S. Cl.
CPC ..... *F16H 48/10* (2013.01); *F16H 2057/0235* (2013.01)

(58) Field of Classification Search
CPC .. F16H 48/10; F16H 2057/0235; F16H 48/06; F16H 5/00–5/32; F16H 48/00–2048/426
See application file for complete search history.

(56) References Cited

U.S. PATENT DOCUMENTS

| | | | |
|---|---|---|---|
| 7,074,151 B2 | 7/2006 | Thompson | |
| 7,326,141 B2 * | 2/2008 | Lyons | B62D 11/16 180/6.7 |
| 8,029,399 B2 * | 10/2011 | Thompson | B62D 11/14 475/339 |
| 8,303,446 B2 * | 11/2012 | Thompson | F16H 35/008 475/5 |
| 9,975,576 B2 | 5/2018 | Flaxman | |
| 2007/0102209 A1 * | 5/2007 | Doebereiner | B60K 6/445 180/6.7 |
| 2007/0213160 A1 | 9/2007 | Lyons et al. | |
| 2007/0240962 A1 | 10/2007 | Parthuisot et al. | |
| 2008/0210481 A1 * | 9/2008 | Boss | B62D 11/04 180/65.7 |
| 2008/0300080 A1 | 12/2008 | Thompson | |
| 2010/0105511 A1 | 4/2010 | Thompson | |
| 2017/0368931 A1 | 12/2017 | Tesar | |

FOREIGN PATENT DOCUMENTS

| | | | |
|---|---|---|---|
| GB | 674756 A | 7/1952 | |
| WO | WO02083483 A1 | 10/2002 | |
| WO | WO2009013454 A1 | 1/2009 | |
| WO | WO2012128583 A2 | 9/2012 | |
| WO | WO2014206597 A1 | 12/2014 | |
| WO | 201719856 A1 | 11/2017 | |
| WO | WO-2017198356 A1 * | 11/2017 | B60K 17/16 |
| WO | 2018082828 A1 | 5/2018 | |

OTHER PUBLICATIONS

Partial Search Report for Great Britain Patent App. No. 2000519.5 (dated Jun. 25, 2020) for Claim 1.
Partial Search Report for Great Britain Patent App. No. 2000519.5 (dated Apr. 12, 2021) for claims 14-22.
Written Opinion for PCT Patent App. No. PCT/EP2021/050375 (dated Jun. 9, 2021).
Israel Patent Office; Office Action in related Israeli Patent Application No. 294354 dated Nov. 19, 2024; 6 pages.
European Patent Office; Examination Report in related European Patent Application No. 21 700 689.9 dated Feb. 14, 2025; 8 pages.
Singapore Patent Office; Office Action in related Singapore Patent Application No. 11202251075Y dated Dec. 31, 2024; 44 pages.

* cited by examiner

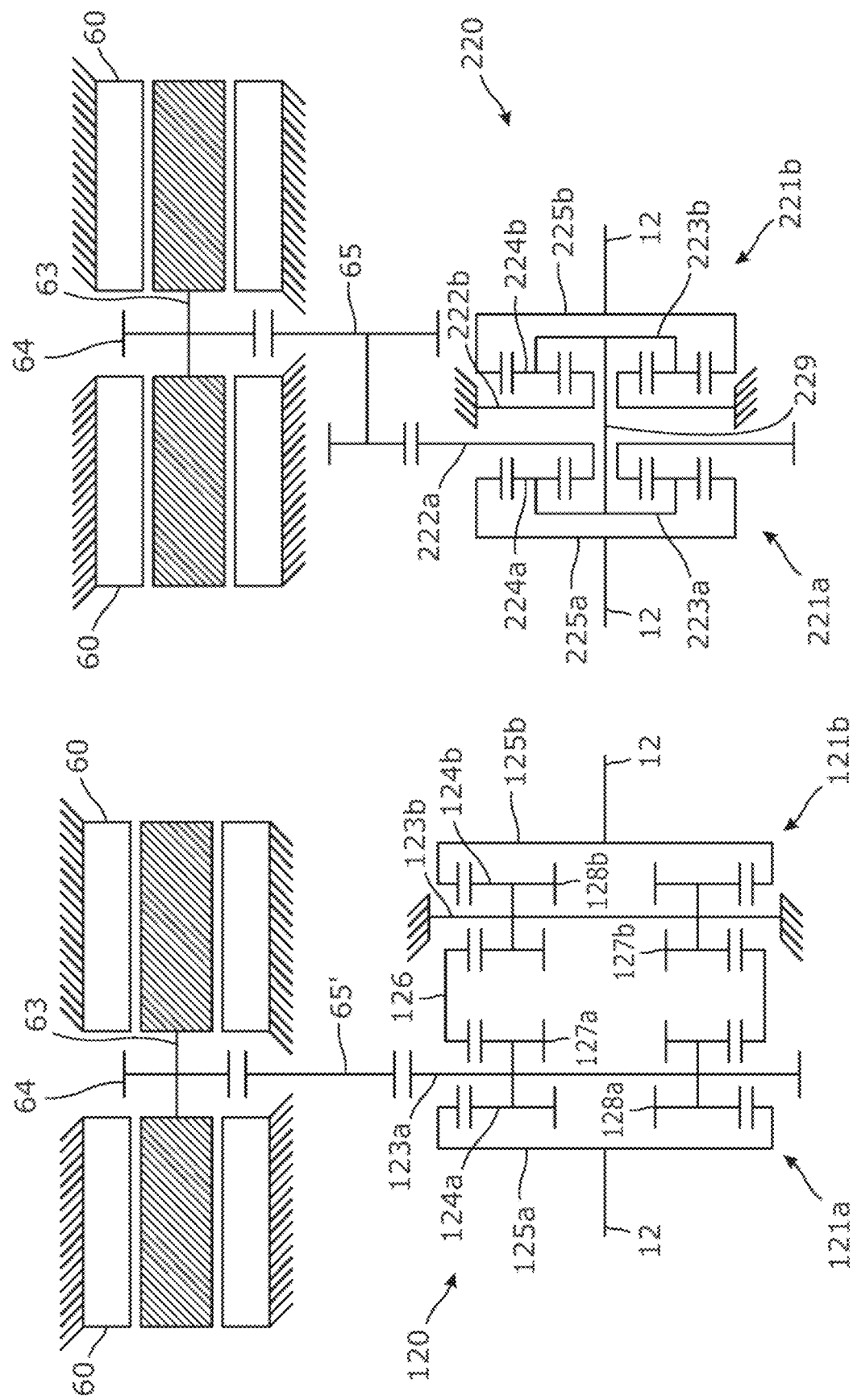

DRIVE SYSTEM FOR A SKID STEERED VEHICLE

CROSS REFERENCE TO RELATED APPLICATION(S)

This application is a national phase filing under 35 C.F.R. § 371 of and claims priority to PCT Patent Application No. PCT/EP2021/050375, filed on Jan. 11, 2021, which claims the priority benefit under 35 U.S.C. § 119 of British Patent Application No. 2000519.5, filed on Jan. 14, 2020, the contents of each of which are hereby incorporated by reference in their entireties.

TECHNICAL FIELD

The present disclosure relates to novel drive configurations for skid steered vehicles, including tracked or wheeled vehicles.

BACKGROUND

A skid steered tracked vehicle is steered by forcing opposite parallel tracks to run at different speeds (skid steering). Similarly, a skid steered wheeled vehicle is steered by forcing wheels on one side of the vehicle to run at different speeds to the wheels on the other side of the vehicle. For tracked vehicles to steer, large driving force differences are required between the two tracks—large braking forces on the inner track and high driving forces on the outer track. Differential gears and cross-shafts are used to control the relative speeds of the tracks and transfer the braking power from the inner track to the outer track to sustain the turn. A similar arrangement is used for a skid steered wheeled vehicle.

A number of electric track drive arrangements use a separate electric motor to drive each track, known as a "two-line" system. The regenerative steering power in such a system is generally handled electrically resulting in the need for oversized motors and power convertors to handle this power. An alternative configuration uses the same mechanical regenerative arrangement as in a conventional transmission combined with an electric drive, known as a "cross-shaft" electric drive system. In this arrangement, the steer cross-shaft runs across the vehicle outside the propulsion motor which increases the size of the assembly and requires a number of idler gears. If a gear change is to be used, the propulsion cross-shaft should be separate from the motor shaft. This can be achieved by making the motor shaft hollow and passing the cross-shaft through the motor shaft. However, this increases the diameter of the motor bearings making a high speed motor difficult to achieve. The propulsion cross-shaft may be mounted outside of the motor, or the motor mounted outside of the propulsion shaft, but this increases the package size and adds need for idler gears, increasing the complexity of the arrangement and reducing its efficiency.

International patent application publication number WO2014/206597 discloses a drive system for a skid steered vehicle having a controlled differential configured to cause transmission of regenerative steering power through the propulsion motor shaft thereby removing the need for cross-shafts. Steer motors are mounted on a shaft which is interconnected via gears with the controlled differential, the outputs of which are in direct connection with the drive outputs of the drive system. A pair of electric propulsion motors are located on either side of the controlled differential, the electric propulsion motors being arranged to provide drive to the drive shafts via respective gear change and gear reduction units located outboard of the motors and connected to the drive shafts in a parallel connection with the outputs from the controlled differential such that the rotational speed of the drive outputs is controlled by both the outputs of the controlled differential, and the outputs of the gear reduction units. Such a drive arrangement has been found to be mechanically efficient in tests. However, the configuration is not optimised from a packaging or maintenance point of view.

It is against this background that the described drive unit has been developed.

SUMMARY

The presently disclosed subject matter provides a drive unit for a skid steered vehicle, the drive unit including: a controlled differential positioned between and connecting two shafts and being in driveable communication with each shaft, wherein the end of each shaft remote from the controlled differential forms an output of the drive unit, and wherein outputs from the controlled differential connect directly via the shafts to the drive unit outputs such that outputs of the controlled differential attach solidly to and turn at the same speed as the drive unit outputs; at least one steer motor in driveable communication with the controlled differential; at least one electric propulsion motor in driveable communication with the drive unit outputs; and a gear reduction unit and/or a gear change unit positioned between the controlled differential and the at least one electric propulsion motor and in driveable communication with the drive unit outputs, wherein the at least one electric propulsion motor, the gear reduction unit and the optional gear change unit are connected in a parallel connection with an output of the controlled differential to the drive unit outputs.

The positioning of the gear reduction unit (and gear change unit if present) between the controlled differential and the electric propulsion motor allows for a more efficient package and for a more efficient drive system. In addition routine maintenance is facilitated by this arrangement as all of the gearing is located together.

The controlled differential, the propulsion motor, and the gear reduction/change assembly are connected in series and then connect in parallel to the shaft such that the output torque of the propulsion motor/gear change/gear reduction assembly, and the output torque of the controlled differential, are summed onto the shaft. This is in contrast to earlier arrangements where the output torque of the propulsion motor and the output torque of the controlled differential were summed onto a shaft and then went through a gear reduction stage which possibly required a large gear reduction stage that needed to be sized for both propulsion and steering torques.

Optionally, the controlled differential, the at least one steering motor, the at least one electric motor, the gear reduction unit and optional gear change unit are located within a housing which can be fitted/re-fitted to a vehicle as a single module drive unit. The housing may include a number a separate housings connected together. The separate housings may be individually separable from the housing. The separate housings may, for example, each contain one or more of the controlled differential, the at least one steering motor, the at least one electric motor, or the gear reduction unit and optional gear change unit.

The controlled differential may optionally include two epicyclic gear sets, wherein a rotational component of a first one of the epicyclic gear sets is constrained to move together with a rotational component of the second one of the epicyclic gear sets. In particular, a ring gear of the first one of the epicyclic gear sets may be constrained to move together with a ring gear of the second one of the epicyclic gear sets, or the two epicyclic gear sets may share a common ring gear.

Optionally, a carrier of the first one of the epicyclic gear sets and a carrier of the second one of the epicyclic gear sets may include the outputs of the controlled differential. Alternatively, a ring gear of the first one of the epicyclic gear sets and a ring gear of the second one of the epicyclic gear sets may include the outputs of the controlled differential.

The at least one steering motor may be in driveable communication with a rotational component of a first one of the epicyclic gear sets and a rotational component of the second one of the epicyclic gear sets may optionally be constrained against rotation.

The drive unit may include a brake assembly located substantially within a rotor of the at least one propulsion motor for efficient packaging.

Optionally, the drive unit may include two electric propulsion motors, and wherein the controlled differential is located between the electric propulsion motors.

Optionally the drive unit includes two gear reduction units, and/or two gear change units, wherein each gear reduction unit and optional gear change unit is located between the controlled differential and one of the electric propulsion motors.

The major axis of the at least one electric propulsion motor may be co-axial with the shafts.

In another aspect, the presently disclosed subject matter provides a gear change unit including a gear reduction unit, wherein the gear reduction unit includes an epicyclic gear set having an input component and an output component, wherein the output component is configured to provide a final drive input from the gear change unit to a drive shaft; a gear change set, wherein the gear change set includes a master gear configured to receive a drive output from an electric propulsion motor and one or more slave gears, wherein the one or more slave gears are configured to be driven by the master gear via one or more gear chains; and a slideable dog clutch operably connectable to a gear change selector, wherein the slideable dog clutch is in slideable engagement with the input component of the gear reduction unit and constrained for rotation therewith, wherein the slideable dog clutch is configured to be engageable with the master gear and/or the one or more slave gears of the gear change set so that, in use, the relative position of the slideable dog clutch with respect to the input component of the gear reduction unit determines which gear of the gear change set is engaged with the input component of the gear reduction unit. This arrangement is particularly, but not exclusively, suited to a system having co-axial electric propulsion motors.

Optionally the gear change set includes an epicyclic gear set, wherein the master gear includes an input to the epicyclic gear set. Again, this arrangement is particularly, but not exclusively, suited to a system having co-axial electric propulsion motors.

The gear change set optionally includes two or more epicyclic gear sets arranged in series, wherein the master gear includes an input to a first epicyclic gear set in the series, and wherein the one or more slave gears include a carrier or a sun gear of another epicyclic gear set in the series.

The input component of the gear reduction unit may include an elongate boss, wherein the slideable dog clutch is slideably connected to the elongate boss, and constrained for rotation therewith by interengaging splines located on the elongate boss and the slideable dog clutch respectively.

Optionally the input component includes a sun gear of the gear reduction unit and the output component includes a carrier of the gear reduction unit.

The sun gear of the gear reduction unit may optionally include a central opening through which the drive shaft passes.

The sun gear of the gear reduction unit may be arranged to float on the drive shaft such that, in use, the sun gear is centred for rotation about the drive shaft by a plurality of planet gears of the gear reduction unit. This arrangement obviates the need for bearings to support the sun gear thus reducing friction in the system which is beneficial, and also the sun gear can float radially and so allows for improved load sharing between the planet gears of the reduction stage.

The sun gear may include thrust rings which are located on each side of the sun gear, wherein the thrust rings are arranged so that the planet gears of the gear reduction unit run between the thrust rings in use. In this way the sun gear is axially located with respect to the planet gears and carrier.

In a further aspect, the presently disclosed subject matter provides a drive unit as described above including a gear change unit as described above.

In a still further aspect, the presently disclosed subject matter provides a drive configuration for a skid steered vehicle including a respective drive member adapted to be located at each side of the vehicle, each drive member engaging with a track or wheel of the vehicle and operable to drive the tracks or wheels of the vehicle; and a drive unit as described above, wherein each drive member is in driveable communication with an output of the drive unit.

In another aspect, the presently disclosed subject matter provides a vehicle including a drive unit as described above and/or a gear change unit as described above.

BRIEF DESCRIPTION OF THE FIGURES

The presently disclosed subject matter will now be described by way of non-limiting examples with reference to the following figures, in which:

FIGS. 4a to 4c show schematic representations of alternative configurations for the controlled differential shown in FIG. 2;

FIG. 5b shows a magnified view of a gear assembly of the drive unit shown in FIG. 5a;

FIG. 6a shows a schematic representation of another alternative configuration for the gear change unit to that shown in FIG. 5a;

FIG. 6b shows a magnified view of a gear assembly of the drive unit shown in FIG. 6a;

DETAILED DESCRIPTION

Figure 1:
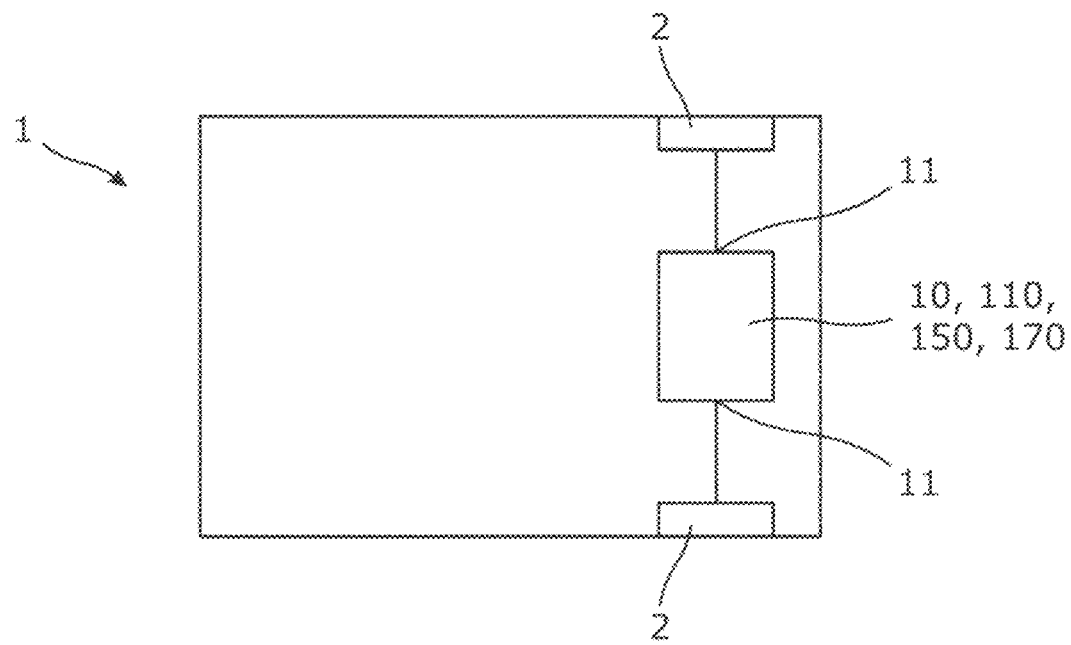
FIG. 1 shows a schematic view of a skid steered vehicle includincluding a drive unit in accordance with an embodiment.

FIG. 1 shows a schematic representation of a skid steered vehicle 1 includincluding a drive unit 10. The drive unit 10 is mounted on the skid steered vehicle 1 and drive outputs 11 located on either side of the drive unit 10 are connected to respective drive members 2 located at either side of the vehicle. The members 2 engage with a track or wheel (not shown) of the vehicle and are operable to drive the tracks or wheels of the vehicle.

Figure 2:
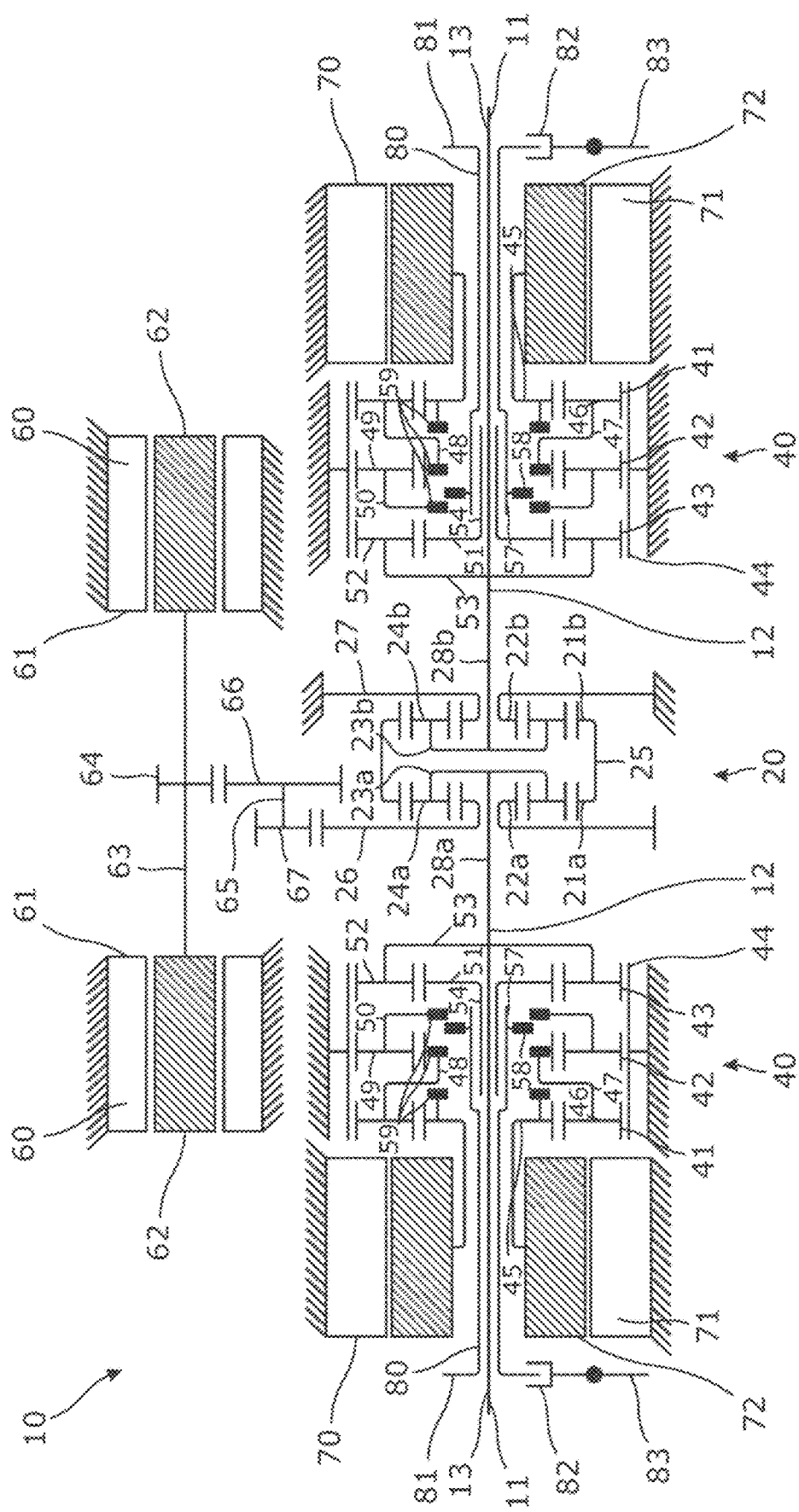
FIG. 2 shows a schematic representation of the components and component connections in a drive unit in accordance with an embodiment.

A schematic representation of the components and component connections in an embodiment of the drive unit 10 is shown in FIG. 2. The drive unit 10 includincludes a controlled differential 20 located between and connecting two shafts 12. Outputs 28a, 28b of the controlled differential 20 are in driveable communication with each shaft 12 as will be described in greater detail below.

The controlled differential 20 includincludes two epicyclic gear sets 21a, 21b. Each epicyclic gear set 21a, 21b, includincludes a sun gear 22a, 22b, a carrier 23a, 23b forming the outputs 28a, 28b of the controlled differential 20, planet gears 24a, 24b, and a common ring gear 25.

The drive unit 10 has two steer motors 60 each includincluding a stator 61 and a rotor 62 which rotates around a major axis of the steer motor in use. The rotors 62 of each steer motor 60 are each driveably connected to a steer shaft 63 co-axial with the major axis of the steer motors 60 so that, in use, the steer shaft 63 is driven by both steer motors 60. In an alternative arrangement, only one steer motor 60 is provided.

The steer shaft 63 includincludes a primary steer gear 64 which meshes with an intermediate compound steer gear 65 having an input side gear 66 located on a common shaft with an output side gear 67. The output side gear 67 meshes with a differential input gear 26 which is fixed to the sun gear 22a of the epicyclic gear set 21a on one side of the controlled differential 20 for rotation therewith. The sun gear 22b of the other epicyclic gear set 21b located on the other side of the controlled differential 20 is fixed against rotation by connection to a spur wheel 27 which is in turn connected to a housing (not shown) of the drive unit 10, or to another fixed location on the chassis (not shown) of the skid steered vehicle 1. Alternatively, the sun gear 22b may be fixed against rotation by connection to a fixed point via another rigid link (not shown) other than a spur wheel 27. In an alternative arrangement, the spur wheel 27 may be a spur gear driveably connected to the steer shaft 63 by a second intermediate gear set as is known in the art (for example from WO2014/206597). In addition, it is not necessary to provide two steer motors 60 and only one steer motor 60 may be used if desired.

The carriers 23a, 23b of the epicyclic gears sets 21a, 21b form outputs 28a, 28b of the controlled differential 20 which are connected to the shafts 12 for rotation therewith. The end 13 of each shaft 12 remote from the controlled differential 20 form outputs 11 of the drive unit 10. As shown, the outputs 28a, 28b from the controlled differential 20 connect directly via the shafts 12 to the drive unit outputs 11 so that the outputs 28a, 28b of the controlled differential 20 attach solidly to and turn at the same speed as the drive unit outputs 11.

Two electric propulsion motors 70 are located on either side of the drive unit 10, each electric propulsion motor 70 includincluding a stator 71 and a rotor 72 which rotates around a major axis of the electric propulsion motors 70 in use. The major axes of the electric propulsion motors 70 are co-axial with the shafts 12 such that each shaft 12 passes through the centre of the rotor 72 of a respective electric propulsion motor 70. The rotors 72 of the electric propulsion motors 70 are supported for rotation on the shafts 12 by bearings (not shown).

The drive unit 10 includincludes two gear change units 40. Each gear change unit 40 is positioned between the controlled differential 20 and one of the electric propulsion motors 70 such that all of the gearing systems (including the controlled differential 20, steer gear 64, intermediate compound gear 65, and gear change units 40) of the drive unit 10 are located substantially in in the middle of the drive unit 10 where they can be most efficiently packaged and accessed for routine maintenance such as the replenishment of lubrication fluid and the like.

Each gear change unit 40 includincludes three epicyclic gear sets 41, 42, 43 arranged in series and sharing a common ring gear 44. With specific reference to the gear change unit 40 on the left hand side as shown in FIG. 2, the first of the epicyclic gear sets 41 in the series includincludes a sun gear 45 which is connected to the rotor 72 of the left hand electrical propulsion motor 70 for rotation therewith. The sun gear 45 of the first epicyclic gear set 41 meshes with planet gears 46 supported for rotation on a carrier 47. The second epicyclic gear set 42 in the series includincludes a sun gear 48 which is connected to the carrier 47 of the first epicyclic gear set 41 in the series and fixed for rotation therewith. The sun gear 48 of the second epicyclic gear set 42 meshes with planet gears 49 supported for rotation on a carrier 50. The planet gears 46, 49 of the first and second epicyclic gear sets 41, 42 also mesh with the common ring gear 44.

The third epicyclic gear set 43 in the series includincludes a sun gear 51, planet gears 52 and a carrier 53. The planet gears 52 of the third epicyclic gear set 43 mesh with the sun gear 51 and the common ring gear 44, and the carrier 53 is connected to the shaft 12 such that the carrier 53 and shaft 12 are constrained to rotate together.

Figure 3:
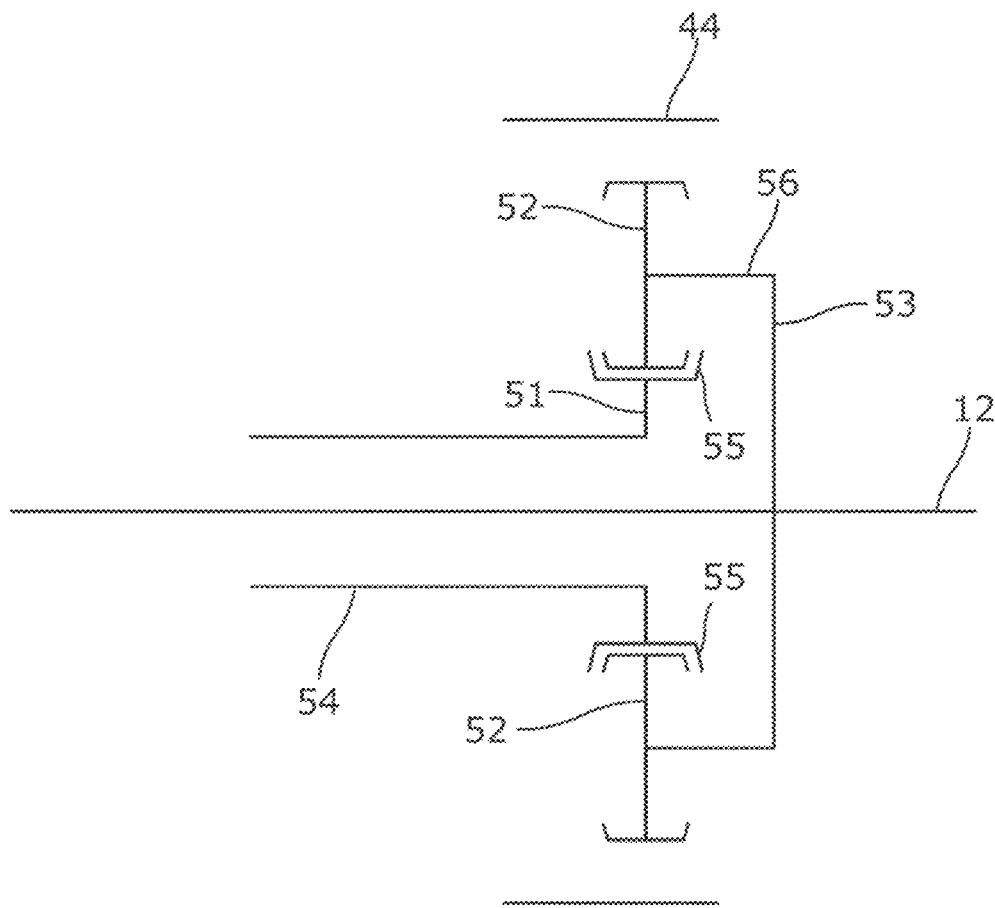
FIG. 3 shows a schematic representation of a detail of part of the drive unit shown in the embodiment of FIG. 2.

The sun gear 51 includincludes an elongate boss 54 which surrounds the shaft 12. No bearings are provided between the sun gear 51 and the shaft 12 such that, in use, the sun gear 51 floats on the shaft 12. A more detailed schematic representation of the third epicyclic gear set 43 is shown in FIG. 3. As shown, the sun gear 51 includincludes thrust rings 55 located on either side of the sun gear 51. The thrust rings 55 protrude beyond the gear teeth (not shown) of the sun gear 51 and contact the sides of the planet gears 52. The thrust rings 55 have slightly conical inner surfaces (about 2° off flat) and the sides of the planet gears 52 are radiused to co-operate with the conical inner surfaces to the thrust rings 55 to reduce friction and to locate the planet gears 52 between the thrust rings 55. In use, the sun gear 51 is axially located on the shaft 12 by the trapping of the planet gears 52 between the thrust rings 55. The sun gear 51 is automatically radially located in use as it is centred between the planet gears 52 as they rotate around the common ring gear 44 and their own axes of rotation 56 on the carrier 53. This arrangement obviates the need for bearings to support the sun gear 51 thus reducing friction in the system which is beneficial, and also the sun gear 51 can float radially and so allows for improved load sharing between the planet gears 52 of the third epicyclic gear set 43.

The elongate boss 54 of the sun gear 51 includes external splines (not shown) which engage with internal splines (not shown) of a dog clutch 57 (also known as a jaw clutch) located on the elongate boss 54. Thus, the dog clutch 57 is constrained for rotation with the elongate boss 54 by the inter-engaging splines, but is able to slide along the length of the elongate boss 54.

The slideable dog clutch 57 includes a plurality of dog (or jaw) formations 58 which are configured to interengage with a plurality of dog (or jaw) formations 59 located respectively on the sun gear 45 of the first epicyclic gear set 41 in the series, and on the sun gear 48 and the carrier 50 of the second epicyclic gear set 42 in the series.

The end of the slideable dog clutch 57 closest to the electric propulsion motor 70 is connected to a gear shift sleeve 80 which surrounds the shaft 12 and passes through the middle of the rotor 72 of the electric propulsion motor 70. The end of the gear shift sleeve 80 remote from the slideable dog clutch 57 includes a flange ring 81 which engages with a gear shift fork 82 and gear shift lever 83.

In use, a first gear ratio between the electric propulsion motor 70 and the shaft 12—and hence the drive unit output 11—is achieved by manipulating the gear lever 83 and fork 82 so that the slideable dog clutch 57 is positioned on the elongate boss 54 of the sun gear 51 in such a position that the dog formations 58 of the slideable dog clutch 57 interlock with the dog formations 59 of the sun gear 45 of the first epicyclic gear set 41. When the dog formations 58 of the slideable dog clutch 57 interlock with the dog formations 59 of the sun gear 45 of the first epicyclic gear set 41, the sun gear 45 is placed into driveable communication with the sun gear 51 of the third epicyclic gear set 43 causing the drive from the rotor 72 of the electric propulsion motor 70 to pass directly as an input to the third epicyclic gear set 43. The rotation of the sun gear 51 cases rotation of the carrier 53, and hence rotation of the shaft 12 and drive output 11, at a speed which is stepped down by the gear ratio across the third epicyclic gear set 43. Because the third epicyclic gear set 43 has a constant gear ratio from its input sun gear 51 to its output carrier 53, it can be thought of as a fixed ratio gear reduction unit. The gear ratio of the third epicyclic gear set 43 may, for example, range from about 2.9:1 to about 3.5:1 depending on various factors including the speed of the electric propulsion motor 70, the final drive ratio, the track or wheel diameter, and other vehicle/transmission characteristics. It will be understood that this range of gear ratios is an example only and is not to be considered as limiting.

A second gear ratio between the electric propulsion motor 70 and the shaft 12 is achieved by manipulating the gear lever 83 and fork 82 so that the slideable dog clutch 57 is positioned on the elongate boss 54 of the sun gear 51 in such a position that the dog formations 58 of the slideable dog clutch 57 interlock with the dog formations 59 of the sun gear 48 of the second epicyclic gear set 42. When the dog formations 58 of the slideable dog clutch 57 interlock with the dog formations 59 of the sun gear 48 of the second epicyclic gear set 42, the sun gear 48 is placed into driveable communication with the sun gear 51 of the third epicyclic gear set 43. In use, the sun gear 45 of the first epicyclic gear set 45 drives the sun gear 48 of the second epicyclic gear set 42 via the planets 46 and carrier 47 of the first epicyclic gear set 41, and the sun gear 48 of the second epicyclic gear set 42 drives the sun gear 51 of the third epicycle gear set (or gear reduction unit) 43. Hence, the output speed of the rotor 72 of the electric propulsion motor 70 is stepped down by the gear ratio of the first epicyclic gear set 41 before being stepped down again by the gear ratio of the third epicyclic gear set 43 giving an overall speed reduction which is a composite of the gear ratios across the first and third epicyclic gear sets 41, 43. As above for the gear ratio of the third epicyclic gear set 43, the gear ratio of the first epicyclic gear set 41 may, for example, range from about 2.9:1 to about 3.5:1 depending on various factors including the speed of the electric propulsion motor 70, the final drive ratio, the track or wheel diameter, and other vehicle/transmission characteristics. It will be understood that this range of gear ratios is an example only and is not to be considered as limiting.

A third gear ratio between the electric propulsion motor 70 and the shaft 12 is achieved by manipulating the gear lever 83 and fork 82 so that the slideable dog clutch 57 is positioned on the elongate boss 54 of the sun gear 51 in such a position that the dog formations 58 of the slideable dog clutch 57 interlock with the dog formations 59 of the carrier 50 of the second epicyclic gear set 42. When the dog formations 58 of the slideable dog clutch 57 interlock with the dog formations 59 of the carrier 50 of the second epicyclic gear set 42, the carrier 50 is placed into driveable communication with the sun gear 51 of the third epicyclic gear set 43. In use, the sun gear 45 of the first epicyclic gear set 41 drives the sun gear 48 of the second epicyclic gear set 42 via the planets 46 and carrier 47 of the first epicyclic gear set 41, and the sun gear 48 of the second epicyclic gear set 42 drives the carrier 50 of the second epicyclic gear set 42 via the planets 49. Hence the carrier 50 of the second epicyclic gear set 42 drives the sun gear 51 of the third epicycle gear set (or gear reduction unit) 43. The output speed of the rotor 72 of the electric propulsion motor 70 is therefore stepped down by the gear ratio of the first epicyclic gear set 41 and the gear ratio of the second epicyclic gear set 42 before being stepped down again by the gear ratio of the third epicyclic gear set 43 giving an overall speed reduction which is a composite of the gear ratios across the first, second and third epicyclic gear sets 41, 42, 43. As above for the gear ratio of the first and third epicyclic gear set 41, 43, the gear ratio of the second epicyclic gear set 42 may, for example, range from about 2.9:1 to about 3.5:1 depending on various factors including the speed of the electric propulsion motor 70, the final drive ratio, the track or wheel diameter, and other vehicle/transmission characteristics. It will be understood that this range of gear ratios is an example only and is not to be considered as limiting. In one example embodiment, the gear ratio across the first, second, and third epicyclic gear sets 41, 42, 42 may be the same. However, this is not essential and the gear ratios may each differ from one another or two of the gear ratios may be the same while the other differs.

As can be seen from FIG. 2, in use all of the components of the first, second and third epicyclic gear sets 41, 42, 43 except for the fixed ring gear 44 will rotate when the rotor 72 of the electric propulsion motor 70 is rotating. However, drive will only be transmitted via any particular gear path if the dog formations 58 of the slideable dog clutch 57 are engaged with the dog formations 59 of that particular gear path.

It will be understood that the right hand side of the drive unit assembly is a mirror image of the left hand side arrangement described above.

The shafts 12 pass from the outputs 28a, 28b of the controlled differential 20, through the centre of the suns 45, 48, 51 of the gear change units 40, and through the centre of the rotors 72 of the electric propulsion motors 70 to the drive unit outputs 11. Therefore, in this embodiment, the shafts 12 are co-axial with the major axes of the controlled differential 20, the gear change unit 40 and the electric propulsion motors 70.

The output 28a of the controlled differential 20, and the output 53 of the left hand gear change unit 40, are connected to the shaft 12 in a parallel connection such that the speed of rotation of the left hand shaft 12—and hence the left hand output 11—is constrained to be the same as the output 28a of the controlled differential 20 and the output 53 of the left hand gear change unit 40. Similarly, The output 28b of the controlled differential 20, and the output 53 of the right hand gear change unit 40, are connected to the shaft 12 in a parallel connection such that the speed of rotation of the right hand shaft 12—and hence the right hand output 11—is constrained to be the same as the output 28b of the controlled differential 20 and the output 53 of the right hand gear change unit 40.

For straight line driving, the steer motors 60 are stationary such that the sun gear 22a of the epicyclic gear set 21a of the controlled differential 20 is held stationary. In this condition there will be no relative difference between the speed of the shafts 12 and the electric drive motors 70 drive the skid steered vehicle 1 in a straight line.

During turning, the steer motors 60 impart drive to the differential input gear 26 to cause the sun 22a of the epicyclic gear set 21a of the controlled differential 20 to rotate thus causing a relative speed difference between the shafts 12. As is known in the art, during turning, the tracks or wheels on one side of the skid steered vehicle 1 travel faster than the tracks or wheels on the other side of the skid steered vehicle 1. In this condition, the steer motor torque imparts an equal and opposite torque between the outputs 28a, 28b of the controlled differential 20. This allows torque from the slower (or inner) track to be transferred across the controlled differential 20 to the faster (or outer) track and hence power is transferred mechanically from the slower track to the faster track through the controlled differential 20. The power used during skid steering can be three to four times the power used for propulsion. Transferring the steering power mechanically, rather than electrically, from the regenerating slower track to the faster track allows considerably smaller electric propulsion motors 70 to be used than would otherwise be the case. The electric propulsion motors 70 therefore have to be sized for propulsion (and not for steering), and the controlled differential 20 and steer motors 60 need be sized for steering.

FIG. 4a shows a schematic diagram of an alternative arrangement for a controlled differential 120 for a drive unit 10 of a skid steered vehicle 1. For clarity, like reference numerals are used to indicate like components.

The controlled differential 120 includes two epicyclic gear sets 121a, 121b. The two epicyclic gear sets 121a, 121b share a ring gear 126 which is located between the two epicyclic gear sets 121a, 121b. Each epicyclic gear set also includes a carrier 123a, 123b located between outer ring gears 125a, 125b and the shared ring gear 126. The carriers 123a, 123b each carry compound planet gears 124a, 124b, wherein each compound planet gear 124a, 124b include inner and outer planet gears 127a, 127b, 128a, 128b mounted on common pinion shafts which pass through the respective carriers 123a, 123b. The outer planet gears 128a, 128b mesh with the outer ring gears 125a, 125b and the inner planet gears 127a, 127b mesh with the shared ring gear 126. The controlled differential 120 has no sun gears.

The innermost ends of the shafts 12 are connected to the outer ring gears 125a, 125b which form the outputs of the controlled differential 120.

The controlled differential 120 is controlled by steer motors 60 which share a common steer shaft 63 carrying a steer gear 64. The steer gear 64 is driveably connected to the carrier 123a of one of the epicyclic gear sets 121a of the controlled differential 120 via an intermediate gear 65' which meshes with teeth (not shown) provided on the outer edge of the carrier 123a of the epicyclic gear set 121a. The carrier 123b of the other epicyclic gear set 121b is fixed against rotation by connection to a housing (not shown) of the drive unit 10, or to another fixed location on the chassis (not shown) of the skid steered vehicle 1. In an alternative arrangement, the carrier 123b may be driveably connected to the steer shaft 63 by a second intermediate gear set as is known in the art (for example from WO2014/206597). In addition, it is not necessary to provide two steer motors 60 and only one steer motor 60 may be used if desired.

FIG. 4b shows a schematic diagram of another alternative arrangement for a controlled differential 220 for a drive unit 10 of a skid steered vehicle 1. For clarity, like reference numerals are used to indicate like components.

The controlled differential 220 includes two epicyclic gear sets 221a, 221b, each epicyclic gear set 221a, 221b having a sun gear 222a, 222b, a carrier 223a, 223b, and a ring gear 225a, 225b. The carriers 223a, 223b each carry planet gears 224a, 224b which mesh with the ring gears 225a, 225b and the sun gears 222a, 222b respectively. The carriers 223a, 223b of the two epicyclic gear sets 221a, 221b are fixed together by a rigid link 229 such that they are constrained to rotate at the same speed.

The innermost ends of the shafts 12 are connected to the carriers 223a, 223b which form the outputs of the controlled differential 220.

The controlled differential 220 is controlled by steer motors 60 which share a common steer shaft 63 carrying a steer gear 64 which is driveably connected to the sun gear 222a of one of the epicyclic gear sets 221a of the controlled differential 220 via an intermediate compound 35 gear 65. The sun gear 222b of the other epicyclic gear set 221b is fixed against rotation by connection to a housing (not shown) of the drive unit 10, or to another fixed location on the chassis (not shown) of the skid steered vehicle 1. In an alternative arrangement, the sun gear 222b may be driveably connected to the steer shaft 63 by a second intermediate gear set as is known in the art (for example from WO2014/206597). In addition, it is not necessary to provide two steer motors 60 and only one steer motor 60 may be used if desired.

Figure 4C:
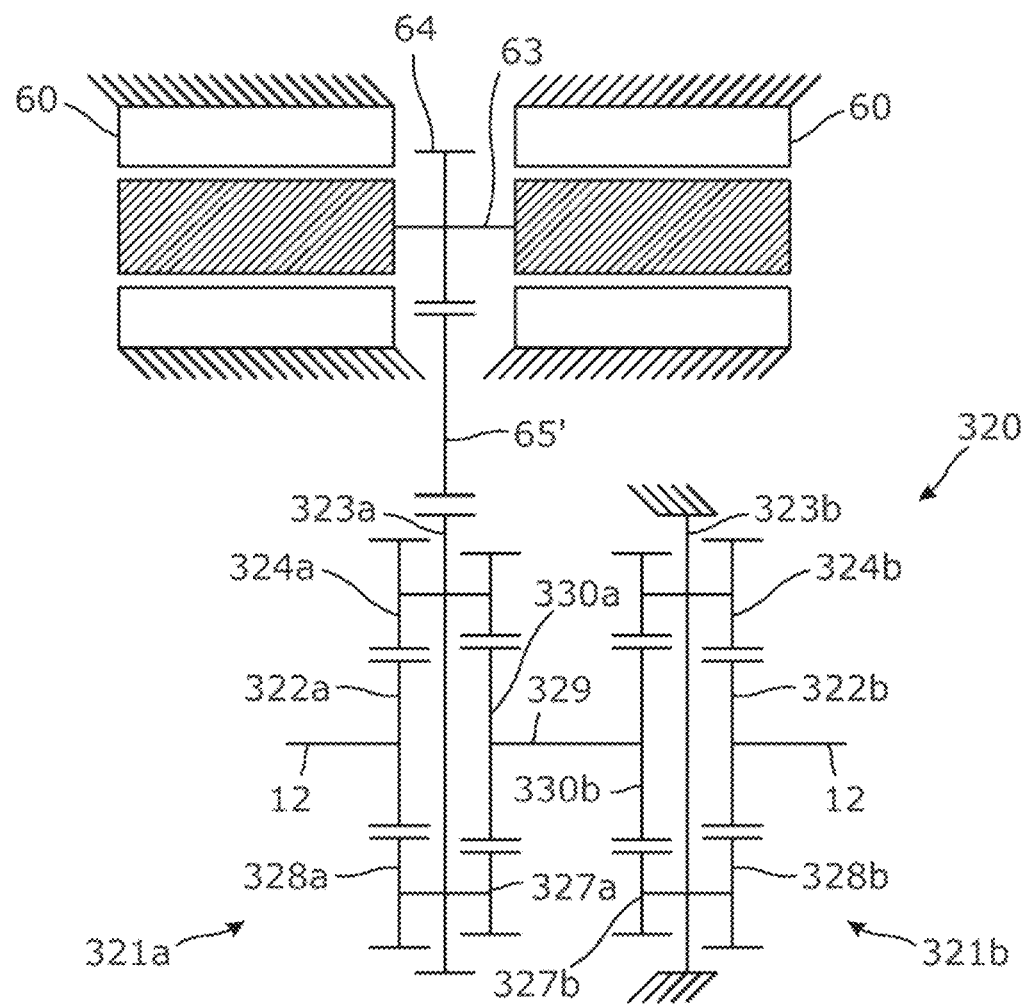

FIG. 4c shows a schematic diagram of a further alternative arrangement for a controlled differential 320 for a drive unit 10 of a skid steered vehicle 1. For clarity, like reference numerals are used to indicate like components.

The controlled differential 320 includes two epicyclic gear sets 321a, 321b, each epicyclic gear set 321a, 321b having outer sun gears 322a, 322b, inner sun gears 330a, 330b, and a carrier 323a, 323b. The carriers 323a, 323b each carry compound planet gears 324a, 324b, wherein each compound planet gear 324a, 324b include inner and outer planet gears 327a, 327b, 328a, 328b mounted on common pinion shafts which pass through the respective carriers 323a, 323b. The outer planet gears 328a, 328b mesh with the outer sun gears 322a, 322b, and the inner planet gears 327a, 327b mesh with the inner sun gears 330a, 330b respectively. The inner sun gears 330a, 330b of the two epicyclic gear sets 321a, 321b are fixed together by a rigid link 329 such that they are constrained to rotate at the same speed. The controlled differential 320 has no ring gears.

The innermost ends of the shafts 12 are connected to the outer sun gears 322a, 322b which form the outputs of the controlled differential 320.

The controlled differential 320 is controlled by steer motors 60 which share a common steer shaft 63 carrying a steer gear 64 which is driveably connected to the carrier 323a of one of the epicyclic gear sets 321a of the controlled differential 320 via an intermediate gear 65'. The carrier 323b of the other epicyclic gear set 321b is fixed against rotation by connection to a housing (not shown) of the drive unit 10, or to another fixed location on the chassis (not shown) of the skid steered vehicle 1. In an alternative arrangement, the carrier 323b may be driveably connected to the steer shaft 63 by a second intermediate gear set as is known in the art (for example from WO2014/206597). In addition, it is not necessary to provide two steer motors 60 and only one steer motor 60 may be used if desired.

The controlled differentials 120, 220, 320 and associated intermediate gears 65, 65' described above may be used in place of the controlled differential 20 described above in relation to FIG. 2, wherein all of the remaining features of FIG. 2 remain unchanged.

Figure 5A:
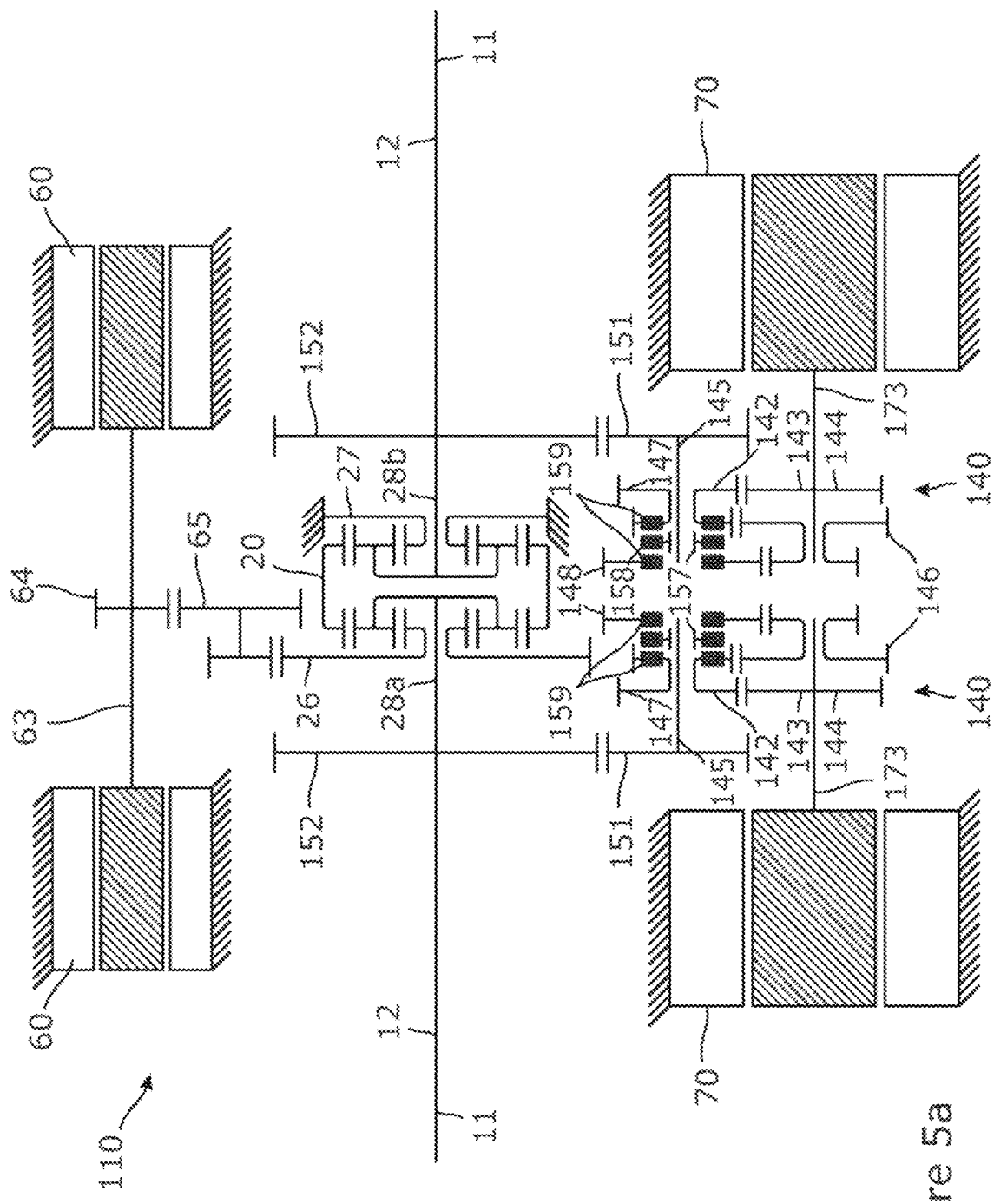
FIG. 5a shows a schematic representation of an alternative configuration for a drive unit to that shown in FIG. 2.

FIG. 5a shows a schematic view of an alternative arrangement of a drive unit 110 for a skid steered vehicle 1. As before, like reference numerals to those used above are used to indicate like components.

The drive unit 110 includes a controlled differential 20 located between and connecting two shafts 12. Outputs 28a, 28b of the controlled differential 20 are in driveable communication with the drive unit outputs 11 located at the ends of the shafts 12 remote from the controlled differential 20. The controlled differential 20 and its connection to the shafts 12 are the same as described above for FIG. 2 and no further description is given here.

As in FIG. 2, in the drive unit of FIG. 5a, two steer motors 60 are connected by a steer shaft 63 which is in operable communication with the controlled differential 20 via differential input gear 26, steer gear 64 and intermediate compound gear 65. As before, the differential input gear 26 is attached to the input sun gear 22a of the controlled differential 20. Spur wheel 27, attached to sun gear 22b of the controlled differential 20 is connected to a housing (not shown) of the drive unit 110, or to another fixed location on the chassis (not shown) of the skid steered vehicle 1. In an alternative arrangement, the spur wheel 27 may be a spur gear driveably connected to the steer shaft 63 by a second intermediate gear set as is known in the art (for example from WO2014/206597). In addition, it is not necessary to provide two steer motors 60 and only one steer motor 60 may be used if preferred. The connection and operation of the steer motors 60 to the controlled differential 20 is as described above in respect of FIG. 2.

In the embodiment of FIG. 5a, the major axis of the electric propulsion motors 70, about which the rotors 72 of the electric propulsion motors 70 rotate in use, are located on an axis which is parallel to, but spaced from, the major axis of the shafts 12. Although the electric propulsion motors 70 are shown as being co-axial (i.e. sharing the same major axis) in FIG. 5a this is not essential and the electric propulsion motors 70 may have major axes which are not aligned.

Each electric propulsion motor 70 is driveably connected to the shafts 12—and hence the outputs 11 of the drive unit 110—via gear change units 140 positioned between the electric propulsion motors 70 and the controlled differential 20. A magnified view of the gear change units 140 is shown in FIG. 5b.

Figure 5B:
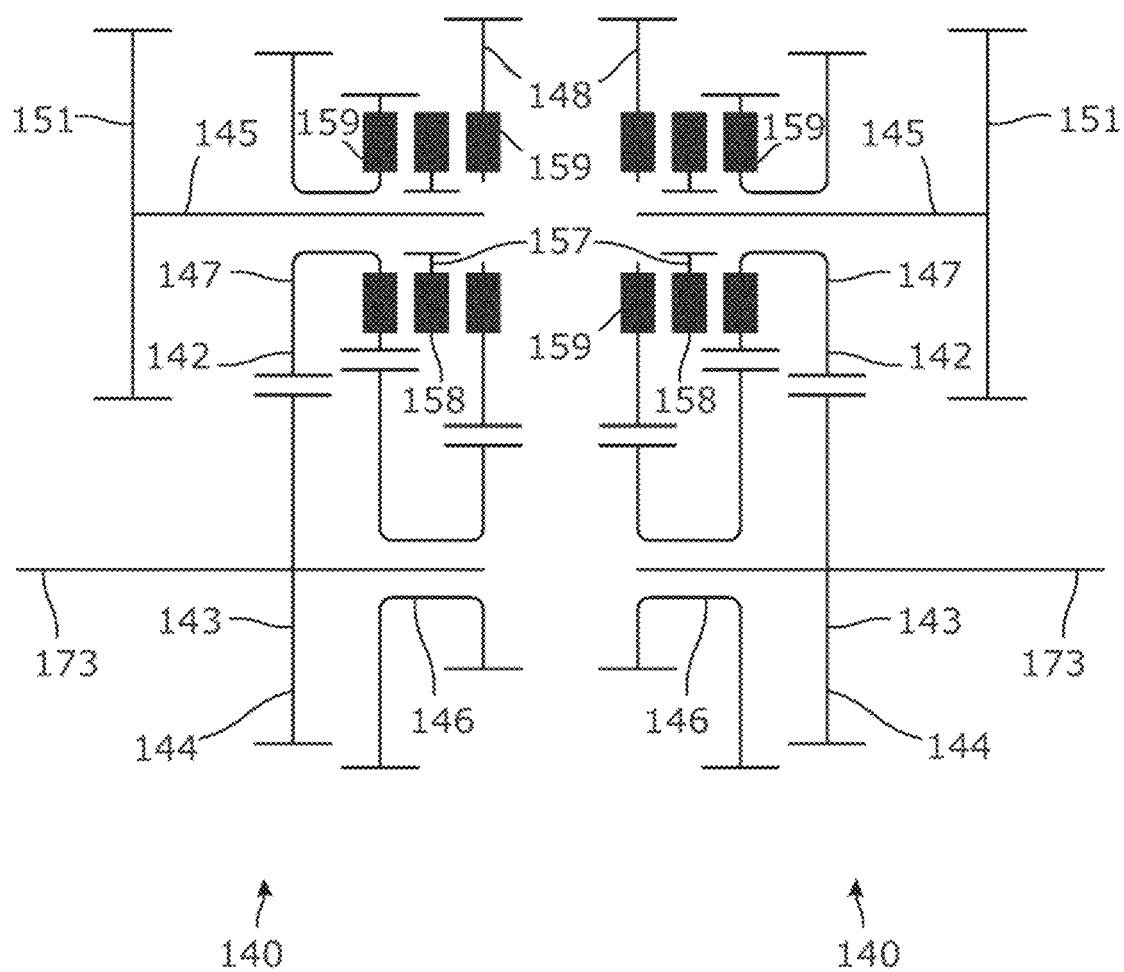

Referring to the left hand side of FIG. 5a and FIG. 5b for the purposes of description, the gear change unit 140 includes a gear reduction unit 143 located on a propulsion input shaft 173 and a gear change set 142 located on an intermediate shaft 145. The gear reduction unit 143 includes a master gear 144 fixed to the propulsion input shaft 173 for rotation therewith, and a first compound slave gear 146 mounted for rotation on the propulsion input shaft 173. The first compound slave gear 146 includes two gears of differing size and tooth number mounted on a common pinion.

The gear change set 142 includes a second compound slave gear 147 and a third slave gear 148 both mounted for rotation on the intermediate shaft 145. The second compound slave gear 147 includes two gears of differing size and tooth number mounted on a common pinion and the third slave gear 148 has yet another size and tooth number.

A slideable dog clutch 157 is mounted on the intermediate shaft 145 via inter-engaging splines (not shown) which fix the slideable dog clutch 157 for rotation with the intermediate shaft 145, but which allow the slideable dog clutch 157 to slide axially with respect to the intermediate shaft 145. The slideable dog clutch 157 is located between the second compound slave gear 147 and the third slave gear 148. The second compound slave gear 147 and the third slave gear 148 each include dog formations 159 configured to engage with dog formations 158 of the slideable dog clutch 157 so that when the dog formations 159 of either the second compound slave gear 147 or third slave gear 148 engage with the dog formations 158 of the slideable dog clutch 157 the gear carrying the engaged dog formations 158 will be in driveable communication with the intermediate shaft 145.

An output gear 151 is fixedly connected to the intermediate shaft 145 for rotation therewith at an end remote from the slideable dog clutch 157. The output gear 151 meshes with a shaft input gear 152 which is fixedly connected to the shaft 12 for rotation therewith.

In use, a first gear ratio between the propulsion input shaft 173 and the shaft 12—and hence the drive unit output 11—is achieved by manipulating a gear lever and fork (not shown) so that the slideable dog clutch 157 is positioned on the intermediate shaft 145 in such a position that the dog formations 158 of the slideable dog clutch 157 interlock with the dog formations 159 of the second compound slave gear 147. When the dog formations 158 of the slideable dog clutch 157 interlock with the dog formations 159 of the second compound slave gear 147, the second compound slave gear 147 is placed into driveable communication with the output gear 151 of the intermediate shaft 145 causing the drive from the propulsion input shaft 173 to pass to the shaft 12 and drive output 11 via shaft input gear 152, at a speed which is stepped down by the gear ratio of a first gear chain including the master gear 143, the second compound slave gear 147, the output gear 151, and the shaft input gear 152.

The gear ratio of the first gear chain (from the propulsion input shaft 173 to the shaft 12) may be in the range of about 4:1 to about 6:1, and the gear ratio across the gear change unit 140 (from the propulsion input shaft 173 to the intermediate shaft 145) may be in the range of about 2.9:1 to about 3.4:1 depending on various factors including the speed of the electric propulsion motor 70, the final drive ratio, the track or wheel diameter, and other vehicle/transmission characteristics. It will be understood that the range of gear ratios given above are an example only and are not to be considered as limiting.

A second gear ratio between the electric propulsion motor 70 and the shaft 12 is achieved by manipulating a gear lever and fork (not shown) so that the slideable dog clutch 157 is positioned on the intermediate shaft 145 in such a position that the dog formations 158 of the slideable dog clutch 157 interlock with the dog formations 159 of the third slave gear 148. When the dog formations 158 of the slideable dog clutch 157 interlock with the dog formations 159 of the third slave gear 148, the third slave gear 148 is placed into driveable communication with the output gear 151 of the intermediate shaft 145 causing the drive from the electric propulsion motor 70 to pass to the shaft 12 and drive output 11 via shaft input gear 152, at a speed which is stepped down by the gear ratio of a second gear chain including the master gear 143, the second compound slave gear 147, the first compound slave gear 146, the third slave gear 148, the output gear 151, and the shaft input gear 152.

The gear ratio of the second gear chain (from the propulsion input shaft 173 to the shaft 12) may be in the range of about 4:1 to about 6:1, and the gear ratio across the gear change unit 140 (from the propulsion input shaft 173 to the intermediate shaft 145) may be in the range of about 2.0:1 to about 3.4:1 depending on various factors including the speed of the electric propulsion motor 70, the final drive ratio, the track or wheel diameter, and other vehicle/transmission characteristics. It will be understood that the range of gear ratios given above are an example only and are not to be considered as limiting.

It will be understood that the right hand side of the drive unit assembly 110 is a mirror image of the left hand side arrangement described above.

The outputs 28a, 28b of the controlled differential 20 and the outputs 151 of the gear change units 140 are connected to the shaft 12 in a parallel connection whereby the speed of rotation of the shafts 12—and hence the outputs 11—in use are determined by the outputs 28a, 28b of the controlled differential 20 and the outputs 151 of the gear change units 40.

The straight line and steering operation of the drive unit 110 of FIG. 5a is therefore the same as described above in respect of FIG. 2.

Figure 6A:
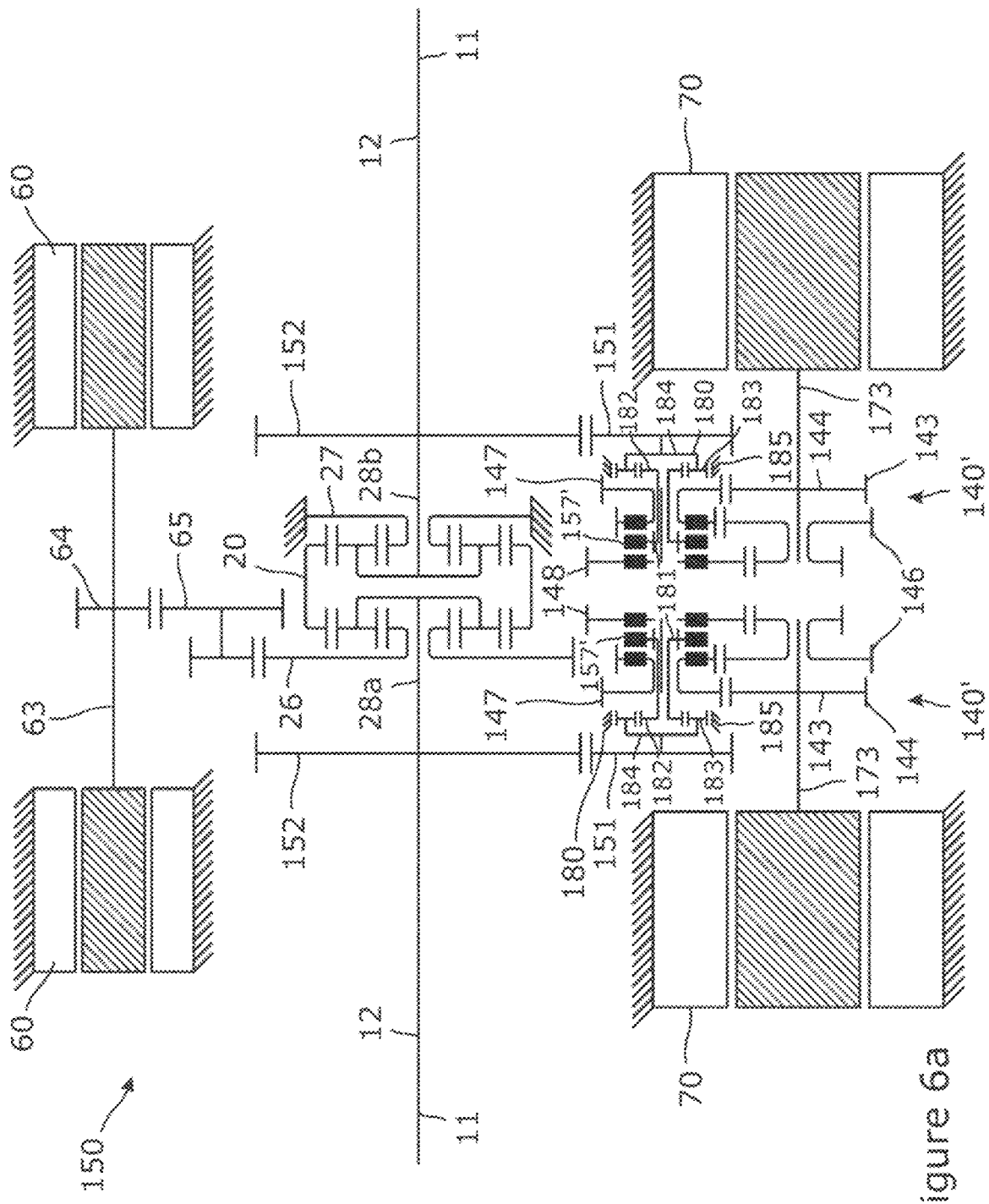
Figure 6B:
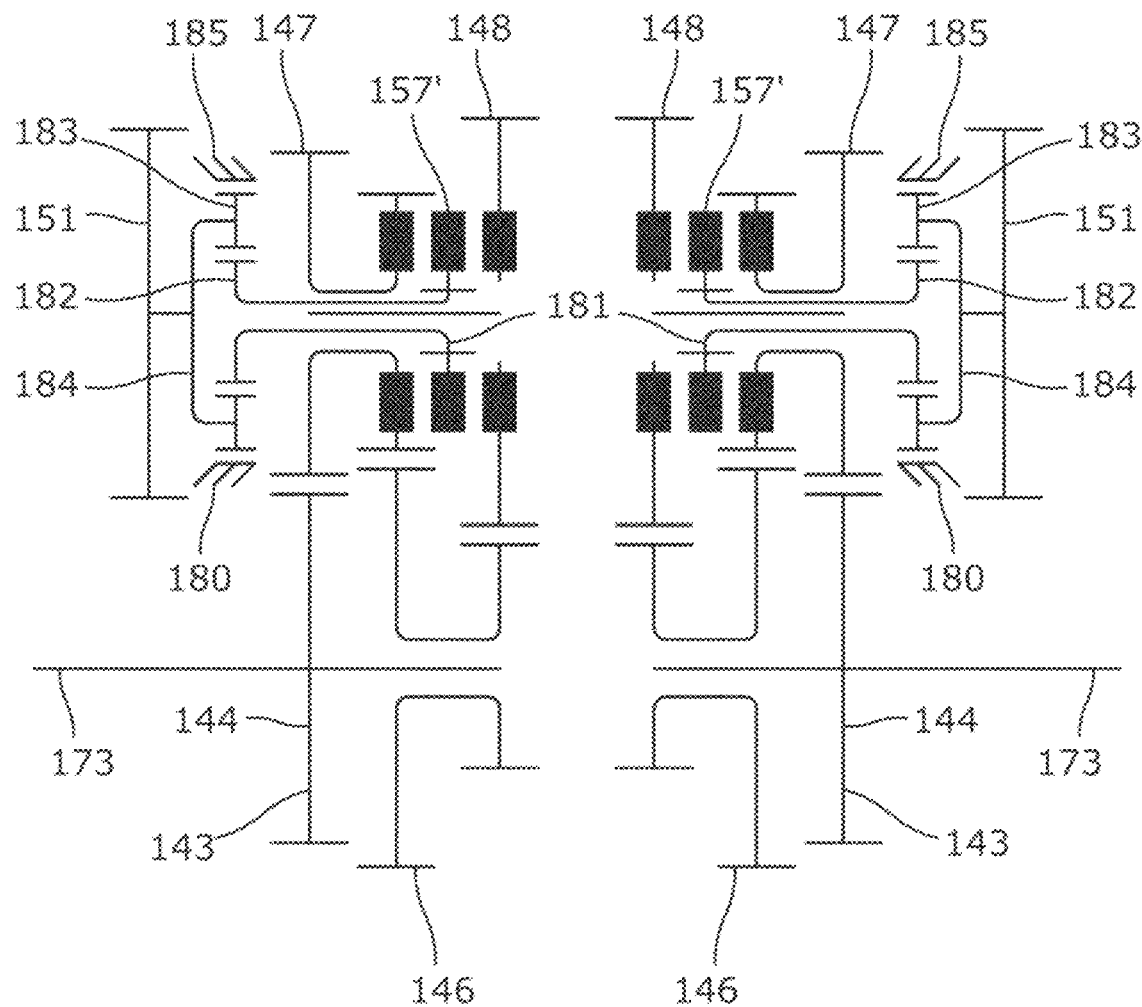

FIG. 6a shows a drive unit 150 which is a modification of the drive unit 110 of FIG. 5a in which the output of the gear change units 140' are modified to include an epicyclic gear set 180 located between the output gear 151 and the second compound slave gear 147. A magnified view of the gear change units 140' is shown in FIG. 6b.

In this embodiment, the slideable dog clutch 157' is slideably connected to an elongate boss 181 of the sun gear 182 of the epicyclic gear set 180 via inter-engaging splines (not shown).

The slideable dog clutch 157' is therefore able to slide axially with respect to the sun gear 182 but is constrained for rotation therewith.

The epicyclic gear set 180 further includes planet gears 183 carried for rotation on a carrier 184, wherein the planet gears 183 mesh with both the sun gear 182 and a ring gear 185 which is fixed against rotation by connection to a housing of the drive unit (not shown) or other fixed location. The carrier 184 is fixed to the output gear 151 for rotation therewith such that drive from the motors 70 pass to the shafts 12 via the gear change unit 140', the epicyclic gear set 180, the output gear 151 and the shaft input gear 152.

It should be noted that in all of the embodiments described above, the gear change units 40, 140, 140' may be substituted for fixed ratio gear reduction units including any suitable combination of gears including simple gear sets and epicyclic gear sets.

Figure 7:
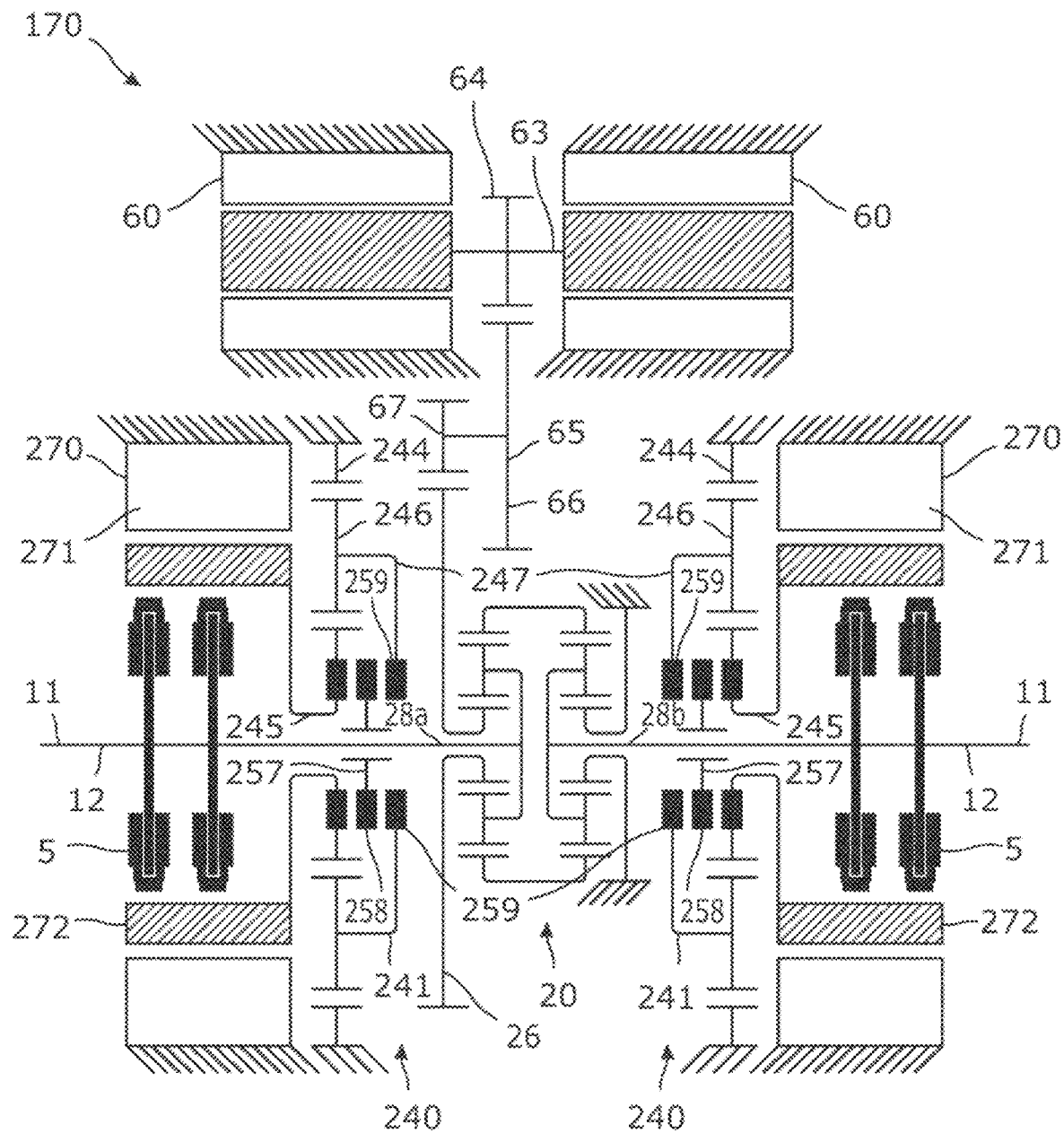
FIG. 7 shows a schematic representation of further alternative configuration for the gear change unit to that shown in FIG. 2.

FIG. 7 shows a schematic view of a further alternative arrangement of a drive unit 170 for a skid steered vehicle 1. As before, like reference numerals to those used above are used to indicate like components.

The drive unit 170 includes a controlled differential 20 located between and connecting two shafts 12. Outputs 28a, 28b of the controlled differential 20 are in driveable communication with each shaft 12. The controlled differential 20, the steering motors 60, the steer shaft 63, steer gear 64, and intermediate compound gear 65 are all as described above in relation to FIG. 2 and will not be described in detail again here.

Two large diameter electric propulsion motors 270 are located one either side of the drive unit 170, each electric propulsion motor 270 including a stator 271 and a rotor 272 which rotates around a major axis of the electric propulsion motors 270 in use. The major axes of the electric propulsion motors 270 are co-axial with the shafts 12 such that each shaft 12 passes through the centre of the rotor 272 of a respective electric propulsion motor 270. The rotors 272 of the electric propulsion motors 270 surround brake assemblies 5 which are substantially located within the rotors 272 of the propulsions motors 270. The rotors 272 are supported for rotation on the shafts 12 by bearings (not shown).

The drive unit 170 includes two gear change units 240. Each gear change unit 240 is positioned between the controlled differential 20 and one of the electric propulsion motors 270 such that all of the gearing systems (including the controlled differential 20, steer gear 64, intermediate compound gear 65, and gear change units 240) of the drive unit 170 are located substantially in in the middle of the drive unit 170.

Each gear change unit 240 includes an epicyclic gear set 241. With specific reference to the gear change unit 240 on the left hand side as shown in FIG. 7, the epicyclic gear set 241 includes a sun gear 245 which is connected to the rotor 272 of the left hand electrical propulsion motor 270 for rotation therewith. The sun gear 245 therefore forms a propulsion input component of the epicyclic gear set 241. The sun gear 245 meshes with planet gears 246 supported for rotation on a carrier 247, wherein the carrier 247 forms an output component of the epicyclic gear set 241.

The shaft 12 in the region of the epicyclic gear set 241 includes external splines (not shown) which engage with internal splines (not shown) of a dog clutch 257 (also known as a jaw clutch) located on the shaft 12. Thus, the dog clutch 257 is constrained for rotation with the shaft 12 by the inter-engaging splines, but is able to slide with respect to the major axis of the shaft 12.

The slideable dog clutch 257 includes a plurality of dog (or jaw) formations 258 which are configured to interengage with a plurality of dog (or jaw) formations 259 located respectively on the sun gear 245 and the carrier 247 of the epicyclic gear set 241. The slideable dog clutch 257 is connected to a gear shift mechanism (not shown).

In use, a direct drive between the electric propulsion motor 270 and the shaft 12—and hence the drive unit output 11—is achieved by manipulating the gear mechanism so that the slideable dog clutch 257 is positioned on the shaft 12 in such a position that the dog formations 258 of the slideable dog clutch 257 interlock with the dog formations 259 of the sun gear 245 of the epicyclic gear set 241. When the dog formations 258 of the slideable dog clutch 257 interlock with the dog formations 259 of the sun gear 245, the sun gear 245 is placed into direct driveable communication with the shaft 12.

Alternatively, the drive from the propulsion motor 270 can be routed to the shaft 12 via a gear chain including the epicyclic gear set 241 by manipulating the gear mechanism so that the slideable dog clutch 257 is positioned on the shaft 12 in such a position that the dog formations 258 of the slideable dog clutch 257 interlock with the dog formations 259 of the carrier 247 of the epicyclic gear set 241 to place the carrier 247 into driveable communication with the shaft 12. Hence, the output speed of the rotor 272 of the electric propulsion motor 270 is stepped down by the gear ratio of the epicyclic gear set 241. The gear ratio of the epicyclic gear set 241 may, for example, range from about 2.9:1 to about 3.5:1 depending on various factors including the speed of the electric propulsion motor 270, the final drive ratio, the track or wheel diameter, and other vehicle/transmission characteristics. It will be understood that this range of gear ratios is an example only and is not to be considered as limiting.

As can be seen from FIG. 7, in use all of the components of the epicyclic gear set 241 except for the fixed ring gear 244 will rotate when the rotor 272 of the electric propulsion motor 270 is rotating. However, drive will be transmitted via any particular drive path if the dog formations 258 of the slideable dog clutch 257 are engaged with the dog formations 259 of that particular drive path.

It will be understood that the right hand side of the drive unit assembly is a mirror image of the left hand side arrangement described above.

The output 28a of the controlled differential 20 and the output of the left hand gear change unit 240 are connected to the shaft 12 in a parallel connection such that the speed of rotation of the left hand shaft 12—and hence the left hand output 11—is constrained to be the same as the output 28a of the controlled differential 20 and the output of the left hand gear change unit 240. Similarly, The output 28b of the controlled differential 20 and the output of the right hand gear change unit 240 are connected to the shaft 12 in a parallel connection such that the speed of rotation of the right hand shaft 12—and hence the right hand output 11—is constrained to be the same as the output 28b of the controlled differential 20 and the output of the right hand gear change unit 240. Straight line driving and steering are achieved in the same way as described above in relation to FIG. 2, FIG. 5a and FIG. 6a.

The drive units 10, 110, 150, 170 described above may be provided within a housing. The housing may include a number a separate housings connected together. The separate housings may be individually separable from the housing. The separate housings may, for example, each contain one or more of the controlled differential, the at least one steering motor, the at least one electric motor, or the gear reduction unit and optional gear change unit.

In the above, the drive units 10, 110, 150, 170 have been described as being symmetrical such that the gear ratios and layout are the same on the left and right hand sides of the drive unit. However, if desired, the gear ratios and/or layout need not be the same on the left and right hand sides of the drive unit.

The gear shift mechanisms may be configured to change gear synchronously such that the gear changes on the left and right hand sides of the drive unit 10, 110, 150, 170 take place at substantially the same time. Alternatively, the gear shift mechanisms may be configured so that the gears are changed on one side of the drive unit before being changed on the other. This arrangement is beneficial as at least one of the electric propulsion motors 70, 270 continues to drive the vehicle during the gear shift. The order of the gear shifts (left hand side first or right hand side first) may be configured to depend on a number of factors including the direction of a turn or the traction of the terrain.

Figure 8:
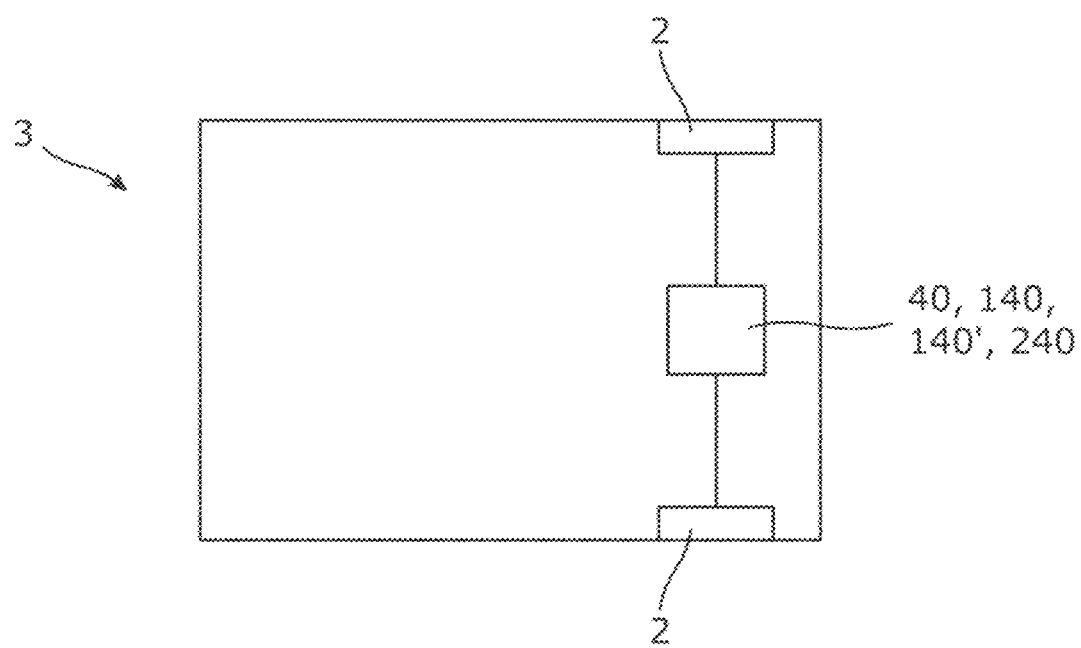
FIG. 8 shows a schematic view of a skid steered vehicle includincluding a gear change unit in accordance with an embodiment.

FIG. 8 shows a schematic representation of a skid steered vehicle 3 including a gear change unit 40, 140, 140', 240 as described above. The gear change unit 40, 140, 140', 240 is mounted on the skid steered vehicle 3 and drive outputs 21 located on either side of the gear change unit 40, 140, 140', 240 are connected to respective drive members 2 located at either side of the vehicle 3. The members 2 engage with a track or wheel (not shown) of the vehicle 3 and are operable to drive the tracks or wheels of the vehicle 3.

The invention claimed is:

1. A drive unit for a skid steered vehicle, the drive unit comprising:
    a controlled differential positioned between and connecting two shafts and being in driveable communication with each shaft,
    wherein the end of each shaft remote from the controlled differential forms an output of the drive unit, to provide drive unit outputs, and wherein outputs from the controlled differential connect directly via the shafts to the drive unit outputs such that outputs of the controlled differential attach solidly to and turn at the same speed as the drive unit outputs;
    at least one steer motor in driveable communication with the controlled differential via a steer shaft having a steer gear that meshes through an intermediate gear with a differential input gear operatively coupled with the controlled differential;
    at least one electric propulsion motor in driveable communication with the drive unit outputs;
    wherein the major axis of the at least one electric propulsion motor is co-axial with the shafts; and
    a gear change unit positioned axially between the controlled differential and the at least one electric propulsion motor and in driveable communication with the drive unit outputs,
    wherein the gear change unit includes at least one epicyclic gear set;
    wherein the controlled differential includes two epicyclic gear sets, wherein a rotational component of a first one of the epicyclic gear sets is constrained to move together with a rotational component of the second one of the epicyclic gear sets, and
    wherein the at least one electric propulsion motor or the at least one steer motor, and the gear change unit are connected in a parallel connection with one of the outputs of the controlled differential to the drive unit outputs.

2. The drive unit according to claim 1, wherein the controlled differential, the at least one steer motor, the at least one electric propulsion motor, and the gear change unit are located within a housing.

3. The drive unit according to claim 1, wherein a ring gear of the first one of the epicyclic gear sets is constrained to move together with a ring gear of the second one of the epicyclic gear sets.

4. The drive unit according to claim 3, wherein the two epicyclic gear sets share a common ring gear.

5. The drive unit according to claim 1, wherein a carrier of the first one of the epicyclic gear sets and a carrier of the second one of the epicyclic gear sets include the outputs of the controlled differential.

6. The drive unit according to claim 1 wherein a ring gear of the first one of the epicyclic gear sets and a ring gear of the second one of the epicyclic gear sets include the outputs of the controlled differential.

7. The drive according to claim 1, wherein the at least one steer motor is in driveable communication with a rotational component of a first one of the epicyclic gear sets.

8. The drive unit according to claim 7, wherein a rotational component of the second one of the epicyclic gear sets is constrained against rotation.

9. The drive unit according to claim 1, including a brake assembly located substantially within a rotor of the at least one electric propulsion motor.

10. The drive unit according to claim 1, wherein the at least one electric propulsion motor comprises two electric propulsion motors, wherein the controlled differential is located between the two electric propulsion motors.

11. The drive unit according to claim 10, including two of the gear change units, wherein each gear change unit is located between the controlled differential and one of the two electric propulsion motors.

12. The drive unit according to claim 1, including:
- an epicyclic gear set, that constitutes one of the two epicyclic gear sets, having an input component and an output component, wherein the output component is configured to provide a final drive input from the gear change unit to a drive shaft;
- a gear change set, wherein the gear change set includes a master gear configured to receive a drive output from the at least one electric propulsion motor and one or more slave gears, wherein the one or more slave gears are configured to be driven by the master gear via one or more gear chains; and
- a slideable dog clutch operably connectable to a gear change selector, wherein the slideable dog clutch is in slideable engagement with an input component of the gear change unit and constrained for rotation therewith, wherein the slideable dog clutch is configured to be engageable with the master gear and/or the one or more slave gears of the gear change set so that, in use, the relative position of the slideable dog clutch with respect to the input component of the gear change unit determines which gear of the gear change set is engaged with the input component of the gear change unit.

13. A drive configuration for a skid steered vehicle comprising:
- a respective drive member adapted to be located at each side of the vehicle, each drive member engaging with a track or wheel of the vehicle and operable to drive the tracks or wheels of the vehicle; and
- the drive unit according to claim 1, wherein each drive member is in driveable communication with an output of the drive unit.

14. A vehicle including a drive unit according to claim 1, including:
- an epicyclic gear set, that constitutes one of the two epicyclic gear sets, having an input component and an output component, wherein the output component is configured to provide a final drive input from the gear change unit to a drive shaft;
- a gear change set, wherein the gear change set includes a master gear configured to receive a drive output from the at least one electric propulsion motor and one or more slave gears, wherein the one or more slave gears are configured to be driven by the master gear via one or more gear chains; and
- a slideable dog clutch operably connectable to a gear change selector, wherein the slideable dog clutch is in slideable engagement with an input component of the gear change unit and constrained for rotation therewith, wherein the slideable dog clutch is configured to be engageable with the master gear and/or the one or more slave gears of the gear change set so that, in use, the relative position of the slideable dog clutch with respect to the input component of the gear change unit determines which gear of the gear change set is engaged with the input component of the gear change unit.

15. The drive unit of claim 1, wherein the controlled differential connects directly via the shafts without any intervening gears to the drive unit outputs.

16. The drive unit of claim 1, wherein the two shafts are coaxial with the drive unit outputs and the controlled differential.

* * * * *